US011306967B2

(12) United States Patent
Rotter

(10) Patent No.: US 11,306,967 B2
(45) Date of Patent: Apr. 19, 2022

(54) DRAWER GASKET SEAL ASSEMBLY

(71) Applicant: WHIRLPOOL CORPORATION, Benton Harbor, MI (US)

(72) Inventor: Chad J. Rotter, Saugatuck, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 76 days.

(21) Appl. No.: 16/786,220

(22) Filed: Feb. 10, 2020

(65) Prior Publication Data

US 2021/0247132 A1 Aug. 12, 2021

(51) Int. Cl.
*F25D 23/08* (2006.01)
*E06B 7/23* (2006.01)
*F25D 25/02* (2006.01)
*F16J 15/3252* (2016.01)

(52) U.S. Cl.
CPC ........ *F25D 25/025* (2013.01); *F16J 15/3252* (2013.01); *F25D 2325/00* (2013.01)

(58) Field of Classification Search
CPC ...... F25D 23/087; F25D 2/025; F25D 25/025; F16J 15/3252; E06B 7/23
See application file for complete search history.

(56) References Cited

U.S. PATENT DOCUMENTS

| | | | | |
|---|---|---|---|---|
| 2,188,815 | A * | 1/1940 | Murphy | F25D 23/087 277/648 |
| 2,263,831 | A * | 11/1941 | Welch | F25D 23/087 49/479.1 |
| 2,736,076 | A | 1/1953 | Bush et al. | |
| 2,680,888 | A | 6/1954 | Jarrow | |
| 2,935,771 | A * | 5/1960 | Hatcher, Jr. | E06B 7/2309 49/493.1 |
| 2,968,845 | A * | 1/1961 | Dickinson | F25D 23/087 49/496.1 |
| 3,037,251 | A | 6/1962 | Landis | |
| 3,126,589 | A * | 3/1964 | Monti | F25D 23/087 49/482.1 |
| 3,360,887 | A * | 1/1968 | Parks | E06B 7/2309 49/490.1 |
| 3,378,958 | A | 4/1968 | Parks et al. | |
| 4,570,948 | A | 2/1986 | Wunderlich et al. | |
| 4,617,759 | A * | 10/1986 | Pasqualini | F25D 23/082 312/405 |
| 5,581,951 | A * | 12/1996 | Ryan | E06B 7/2309 49/489.1 |
| 6,195,942 | B1 * | 3/2001 | Sasaki | E06B 7/2305 49/478.1 |

(Continued)

*Primary Examiner* — Kimberley S Wright
(74) *Attorney, Agent, or Firm* — Price Heneveld LLP

(57) ABSTRACT

A drawer assembly of a refrigerator includes a gasket assembly having a base portion with opposed first and second sides. A mounting portion extends outwardly from the first side of the base portion, and a contact lobe outwardly extends from the second side of the base portion. The contact lobe includes a body portion comprised of a first material having an outer surface with one or more ribs comprised of a second material that is less rigid than the first material. The one or more ribs extend outwardly from the outer surface of the body portion of the contact lobe and are configured to seal against a textured front surface of a cabinet structure of the refrigerator.

18 Claims, 7 Drawing Sheets

(56) References Cited

U.S. PATENT DOCUMENTS

| | | | | |
|---|---|---|---|---|
| 6,227,634 B1* | 5/2001 | Cittadini | F25D 23/087 | 277/630 |
| 6,526,698 B2* | 3/2003 | Park | E05C 19/161 | 49/489.1 |
| 7,047,983 B2* | 5/2006 | Manougian | A45D 33/006 | 132/294 |
| 7,147,292 B2* | 12/2006 | Lee | F25D 23/087 | 312/296 |
| 7,219,471 B2* | 5/2007 | Cittadini | F25D 23/082 | 49/478.1 |
| 8,282,177 B1 | 10/2012 | Rotter | | |
| 8,979,621 B2* | 3/2015 | Kelly | F25D 25/025 | 454/173 |
| 9,580,954 B2* | 2/2017 | Pardue | E06B 7/22 | |
| 9,752,373 B2* | 9/2017 | Pardue | E06B 9/00 | |
| 9,976,335 B2* | 5/2018 | Pardue | E06B 3/30 | |
| 2002/0184828 A1* | 12/2002 | Park | F25D 23/087 | 49/489.1 |
| 2003/0183240 A1* | 10/2003 | Manougian | A45D 33/006 | 132/295 |
| 2003/0222553 A1* | 12/2003 | Lee | F25D 23/087 | 312/296 |
| 2004/0051427 A1* | 3/2004 | Cittadini | F25D 23/082 | 312/296 |
| 2006/0188690 A1* | 8/2006 | Jun | C08L 23/16 | 428/99 |
| 2007/0013146 A1* | 1/2007 | Gariepy | F16L 25/0018 | 277/608 |
| 2008/0276540 A1* | 11/2008 | Kim | F25D 23/087 | 49/478.1 |
| 2008/0302114 A1* | 12/2008 | Kelly | E05B 65/46 | 62/170 |
| 2009/0277096 A1* | 11/2009 | Ramos | F25D 23/087 | 49/478.1 |
| 2016/0273261 A1* | 9/2016 | Pardue | E06B 9/00 | |
| 2017/0130515 A1* | 5/2017 | Pardue | E06B 7/2303 | |
| 2019/0011176 A1 | 1/2019 | Okada | | |
| 2019/0112868 A1* | 4/2019 | Deaver | B61D 19/001 | |

\* cited by examiner

DRAWER GASKET SEAL ASSEMBLY

FIELD OF THE DISCLOSURE

The present disclosure generally relates to a gasket assembly for a refrigerator, and more specifically, to a gasket assembly for sealing a drawer of a refrigerator.

BACKGROUND OF THE DISCLOSURE

A gasket having an internal magnet is often used to create attraction between a gasket profile and a steel cabinet face. Drawer slides are also used to pull a drawer and gasket toward the cabinet face when closing the drawer. While a total magnetic force due to attraction can be high, the local, incremental force on the gasket is low. This low force per length inhibits the gasket's ability to overcome local variations from flatness or straightness. Further, the drawer slide closing force is greatest when the drawer is further away from the cabinet, and reduces as the drawer approaches the closed position. This limits the gaskets ability to conform and overcome variation in order to provide an optimum seal to the cabinet. Thus, there is need to provide an improved seal between an externally accessed storage drawer, typically a freezer drawer, and a refrigeration cabinet structure in a refrigerator appliance.

SUMMARY OF THE DISCLOSURE

According to one aspect of the present disclosure, a refrigerator includes a cabinet structure with a front surface and a storage compartment with an access opening surrounded by the front surface. A drawer assembly includes a drawer front for selectively closing the access opening. The drawer front includes a recessed channel disposed around a periphery of an inner surface of the drawer front. A gasket assembly is mounted to the drawer front at the recessed channel for sealing engagement with the front surface of the cabinet structure when the drawer front closes the access opening. The gasket assembly includes an elongated body of co-extruded material including a base portion with a mounting portion extending outwardly from a first side of the base portion and received in the recessed channel of the drawer front. A contact lobe outwardly extends from a second side of the base portion for sealing engagement with the front surface of the cabinet structure. The contact lobe includes a body portion having first and second ends that are operably coupled to the second side of the base portion at spaced-apart attachment locations and form, therewith, an interior cavity containing a plurality of compressible chambers. The body portion of the contact lobe is comprised of a first material having an outer surface with a pair of longitudinally extending spaced-apart ribs comprised of a second material that is less rigid than the first material. The spaced-apart ribs extend outwardly from the outer surface of the body portion of the contact lobe.

According to another aspect of the present disclosure, a gasket assembly includes a base portion having opposed first and second sides. A mounting portion extends outwardly from the first side of the base portion. A contact lobe outwardly extends from the second side of the base portion and includes a body portion with an interior cavity. The body portion of the contact lobe is comprised of a first material having an outer surface with a plurality of spaced-apart ribs comprised of a second material extending outwardly from the outer surface of the body portion of the contact lobe.

According to yet another aspect of the present disclosure, a refrigerator includes a cabinet structure having a textured front surface and a freezer compartment with an access opening that opens into the freezer compartment. A drawer assembly includes a drawer front for selectively closing the access opening. A gasket assembly is mounted to an inner surface of the drawer front. The gasket assembly includes a contact lobe having a body portion comprised of a more rigid material. The body portion further includes an outer surface with at least one rib outwardly extending therefrom. The at least one rib is comprised of a less rigid material relative to the more rigid material of the body portion of the contact lobe and includes a hardness of less than 1 unit on the Shore 00 hardness scale.

These and other features, advantages, and objects of the present disclosure will be further understood and appreciated by those skilled in the art by reference to the following specification, claims, and appended drawings.

Figure 1A:
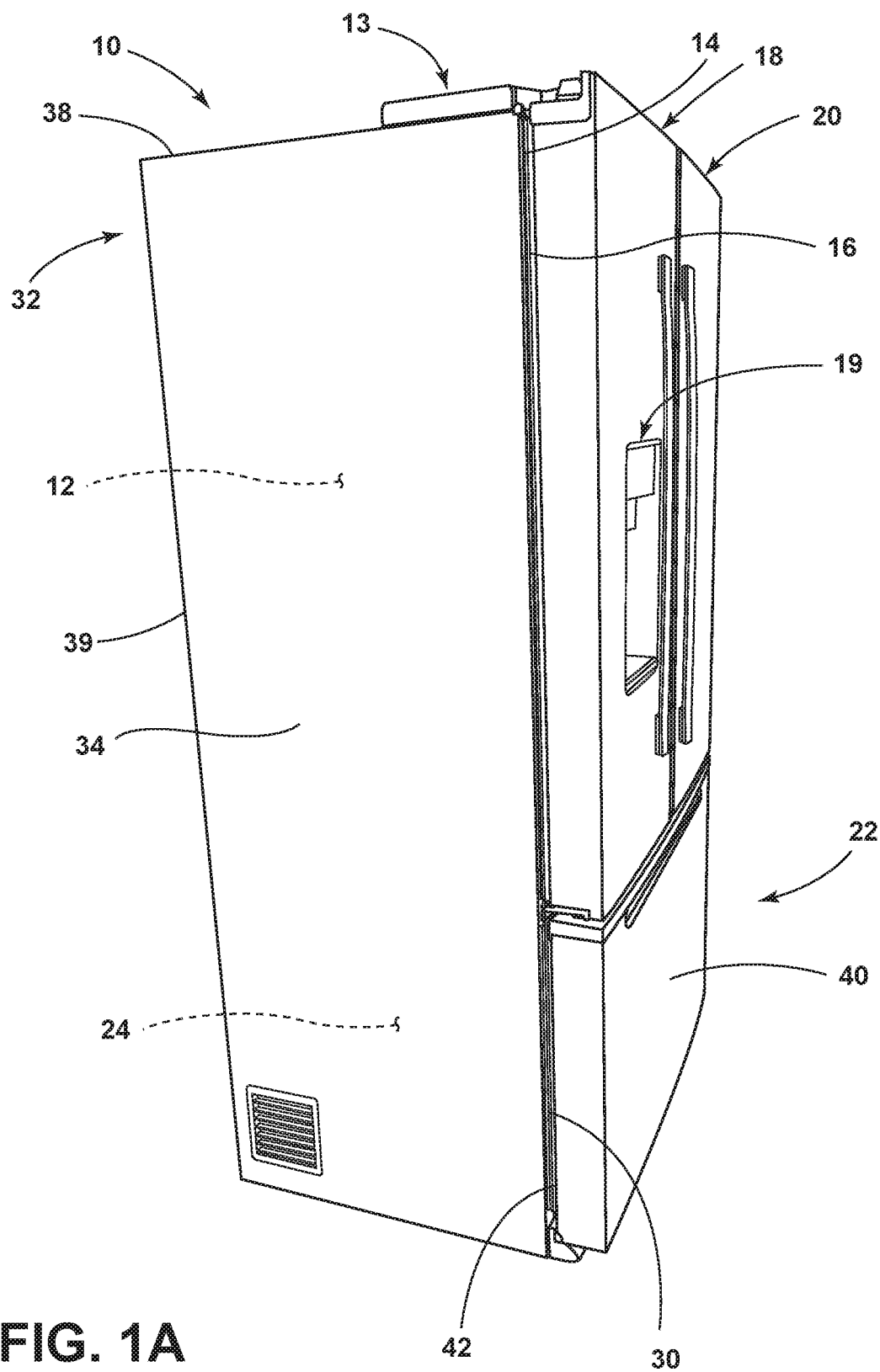
FIG. 1A is a perspective view of a refrigerator according to an embodiment.

The components in the figures are not necessarily to scale, emphasis instead being placed upon illustrating the principles described herein.

DETAILED DESCRIPTION

The present illustrated embodiments reside primarily in combinations of method steps and apparatus components related to a gasket assembly for sealing a drawer of a refrigerator. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1A. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to the embodiment illustrated in FIG. 1A, reference numeral 10 generally designates a refrigerator having a cabinet structure 13 with a front surface 14 opening into a refrigerator compartment 12. The cabinet structure 13 may include a vacuum insulated cabinet structure, as further described below. The refrigerator compartment 12 is contemplated to be an insulated portion of the cabinet structure 13 for storing fresh food items. First and second doors 18, 20 are rotatably coupled to the cabinet structure 13 near the front surface 14 thereof for selectively providing access to the refrigerator compartment 12 by pivoting between open and closed positions. In the embodiment shown in FIG. 1A, a drawer assembly 22 is configured to selectively provide access to a freezer compartment 24 disposed below the refrigerator compartment 12. The refrigerator 10 shown in FIG. 1A is an exemplary embodiment of a bottom-mount refrigerator for use with the present concept, and is not meant to limit the scope of the present concept in any manner. The refrigerator 10 includes storage compartments in the form of the refrigerator compartment 12 and freezer compartment 24, but may include more or fewer storage compartments. As further shown in FIG. 1A, the first door 18 includes a dispensing station 19 which may include one or more paddles configured to initiate the dispensing of water and/or ice from outlets disposed within the dispensing station 19. As further shown in FIG. 1A, the cabinet structure 13 of the refrigerator 10 includes an exterior wrapper 32 which includes a first sidewalls 34, a second side wall (not shown in FIG. 1A), a top wall 38 and a rear wall 39. The exterior wrapper 32 is contemplated to be a metal component formed of a sheet metal material.

With further reference to FIG. 1A, the first and second doors 18, 20 are pivotally coupled to the cabinet structure 13 via hinge assemblies and are adapted to seal against an open front surface 14 of the cabinet structure 13 in an air-tight manner to prevent cold air from escaping the refrigerator compartment 12. Specifically, the first and second doors 18, 20 seal against the front surface 14 of the cabinet structure 13 via flexible gasket assemblies, with a gasket assembly 16 shown disposed between the first door 18 and the cabinet structure 13. The gasket assembly 16 is contemplated to be coupled to the first door 18 for pivoting movement away from and towards the cabinet structure 13. Similarly, the drawer assembly 22 includes a gasket assembly 30 disposed on an inner surface 42 of a drawer front 40 for sealing the drawer assembly 22 to the front surface 14 of the cabinet structure 13. As coupled to the drawer front 40, the gasket assembly 30 is configured for sliding movement with the drawer assembly 22 between open and closed positions relative to the cabinet structure 13 and the freezer compartment 24 thereof. It is contemplated that the cabinet structure 13, the first and second doors 18, 20 and the drawer front 40 may be insulated members.

Figure 1B:
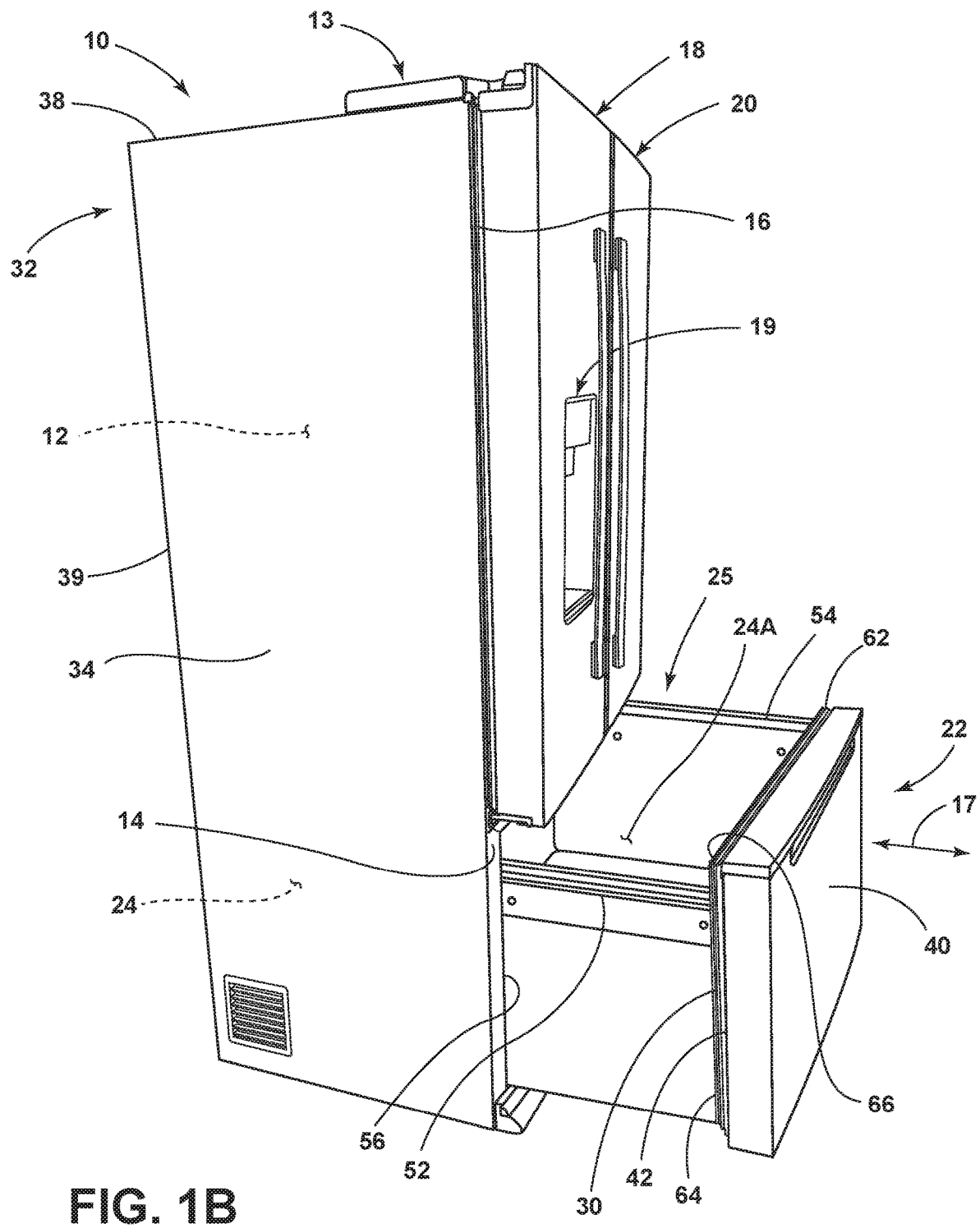
FIG. 1B is a perspective view of the refrigerator of FIG. 1A showing a drawer assembly in an extended position relative to a cabinet structure.

Referring now to FIG. 1B, the drawer assembly 22 is shown in an open position, wherein the drawer assembly 22 has been moved outwardly in a sliding motion from the closed position shown in FIG. 1A. The drawer front 40 of the drawer assembly 22 is shown coupled to a drawer body 25 defining an interior space 24A for storing items therein. The drawer front 40 of the drawer assembly 22 is coupled to the freezer compartment 24 at a freezer liner thereof by opposed slide assemblies 52, 54. The freezer compartment 24 includes an access opening 56 that is surrounded by the front surface 14 of cabinet structure 13 and opens into freezer compartment 24. The drawer front 40 selectively opens and closes the access opening 56 to selectively provide access to the freezer compartment 24 as the drawer assembly 22 moves between the open and closed positions along the path indicated by arrow 17. The slide assemblies 52, 54 are configured to provide a closure force for the drawer assembly 22 that drives the gasket assembly 30 into sealing contact with the front surface 14 of the cabinet structure 13.

The slide assemblies 52, 54 are adapted to move the drawer front 40 toward the closed position under an elastic closure force, which may be provided by a spring or other like mechanism. As such, it is contemplated that an elastic force is stored in the slide assemblies 52, 54 of the drawer assembly 22 as the drawer assembly 22 moves to the open position from the closed position. The stored elastic force is deployed by the slide assemblies 52, 54 of the drawer assembly 22 as the drawer assembly 22 moves from the open position to the closed position. Being an elastic force, it is contemplated that the closure force provided by the slide assemblies 52, 54 is greatest when the drawer assembly 22 is in the fully open position, and decreases as the drawer assembly 22 nears the closed position. The closure force provided by the slide assemblies 52, 24 is contemplated to be approximately 2-3 pounds at the closing of the drawer assembly 22, such that the 2-3 pounds of closure force is provided on the drawer assembly 22 in the closed position in the form of an axial force applied in the closing direction of the drawer assembly 22. Examples of slide assemblies for use with the present concept are described in U.S. Pat. No. 8,282,177 which is incorporated herein by reference in its entirety.

Figure 2:
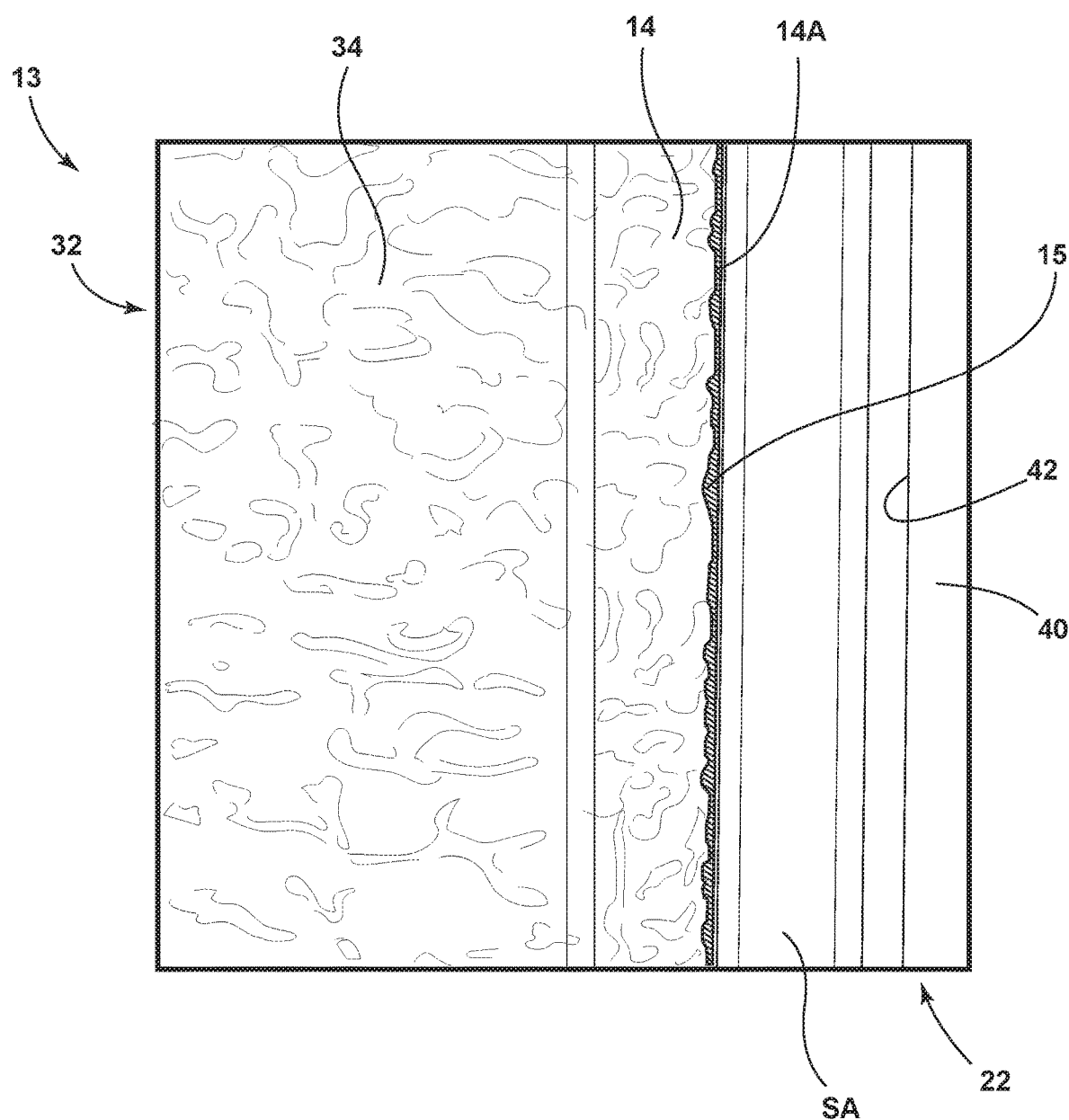
FIG. 2 is a cross-sectional view of a drawer assembly having a conventional seal assembly, wherein the drawer assembly is in a closed position relative to a cabinet structure.

Referring now to FIG. 2, the cabinet structure 13 is shown with the exterior wrapper 32 thereof having the first sidewall 34 and the front surface 14 shown with a textured outer surface that is applied to the exterior wrapper 32. Specifically, the front surface 14 includes a textured outer surface 14A. The undulations of the textured outer surface 14A of the front surface 14 creates a population of micro-pathways that can lead to infiltration of ambient air through spaces between a known seal assembly SA and the textured outer surface 14A. In FIG. 2, the spaces are indicated at reference numeral 15.

Figure 3:
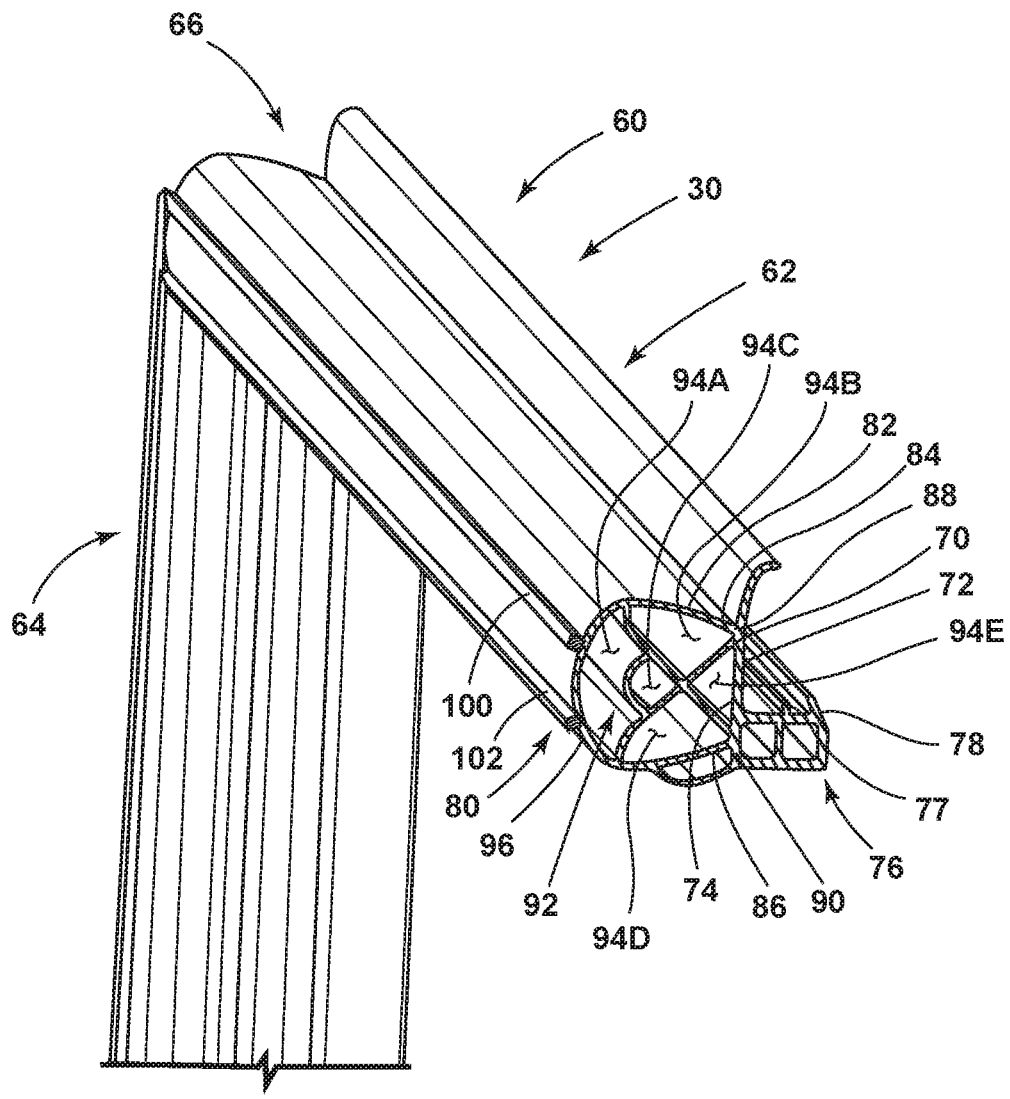
FIG. 3 is a fragmentary cross-sectional view of a gasket assembly according to an embodiment.

Referring now to FIG. 3, the gasket assembly 30 is shown having an elongated body 60 of co-extruded material with both horizontal portions 62 and vertical portions 64 with corner portions 66 disposed therebetween to form a surrounding frame structure. The elongated body 60 includes a base portion 70 having opposed first and second sides 72, 74. A mounting portion 76 extends outwardly from the first side 72 of the base portion 70 and is configured to couple the gasket assembly 30 to the drawer front 40. The mounting portion 76 includes barbs 77, 78 that are configured to hold the mounting portion 76 in-place on the drawer front 40. A contact lobe 80 outwardly extends from the second side 74 of the base portion 70 and is configured for sealing engagement with the front surface 14 of the cabinet structure 13. The contact lobe 80 includes a body portion 82 having first and second ends 84, 86 operably coupled to the second side 74 of the base portion 70 at spaced-apart attachment locations 88, 90 and forming therewith an interior cavity 92 containing a plurality of compressible chambers 94A-94E.

The body portion 82 of the contact lobe 80 is comprised of a more rigid material having an outer surface 96. A pair of longitudinally extending spaced-apart ribs 100, 102, comprised of a less rigid material relative to the more rigid material of the body portion 82, extends outwardly from the outer surface 96 of the body portion 82 of the contact lobe 80. The less rigid material of the spaced-apart ribs 100, 102 is contemplated to be a soft gel-like material that is intended to fill the micro pathways disposed along the textured front surface 14 of the cabinet structure 13 shown in FIG. 2, to seal the freezer compartment 24 in an air tight manner. As outwardly extending from the outer surface 96 of the body portion 82 of the contact lobe 80, the ribs 100, 102 provide a reduced contact area for the gasket assembly 30 as compared to a gasket assembly without ribs that would generally seal against the cabinet structure 13, for instance, using the larger outer surface 96 of the contact lobe 80 alone. The ribs 100, 102 may be referred to herein as first and second ribs 100, 102, wherein the first rib 100 surrounds the second rib 102, such that the ribs 100, 102 may also be referred to as inner and outer ribs 100, 102.

As noted above, the materials used to create the body portion 82 of the contact lobe 80 are different than the materials used to create the ribs 100, 102 disposed on and extending outwardly from the outer surface 96 of the contact lobe 80. While these materials are different materials, they may still be created in a single co-extruding process to create the gasket assembly 30 of the present concept. The differing materials noted above are distinguished by differences in hardness with the first material of the body portion 82 of the contact lobe 80 being more rigid than the second material of the ribs 100, 102. Hardness can be measured using any suitable hardness scale including one of the Shore hardness scales. The different Shore hardness scales measure the resistance of a material to indentation. The Shore 00 hardness scale is used to measure soft substances including gels or foams. The Shore A hardness scale is used to measure substances having an intermediate hardness including rubbers. The Shore D hardness scale is used to measure harder substances including plastics. Thus, the soft materials of the ribs 100, 102 are measured on the Shore 00 hardness scale that is used to measure the hardness of rubbers and gels that are very soft. It is contemplated that the ribs 100, 102 may have a hardness of about 10 units on the Shore 00 hardness scale, or preferably less than 5 units on the Shore 00 hardness scale, and more preferably, the ribs 100, 102 include a hardness of less than 1 unit on the Shore 00 hardness scale. In this way, the ribs 100, 102 approach 0 units on the Shore 00 hardness scale, making the ribs 100, 102 very soft materials that are the least resistant portions to indentation of the gasket assembly 30.

Figure 4A:
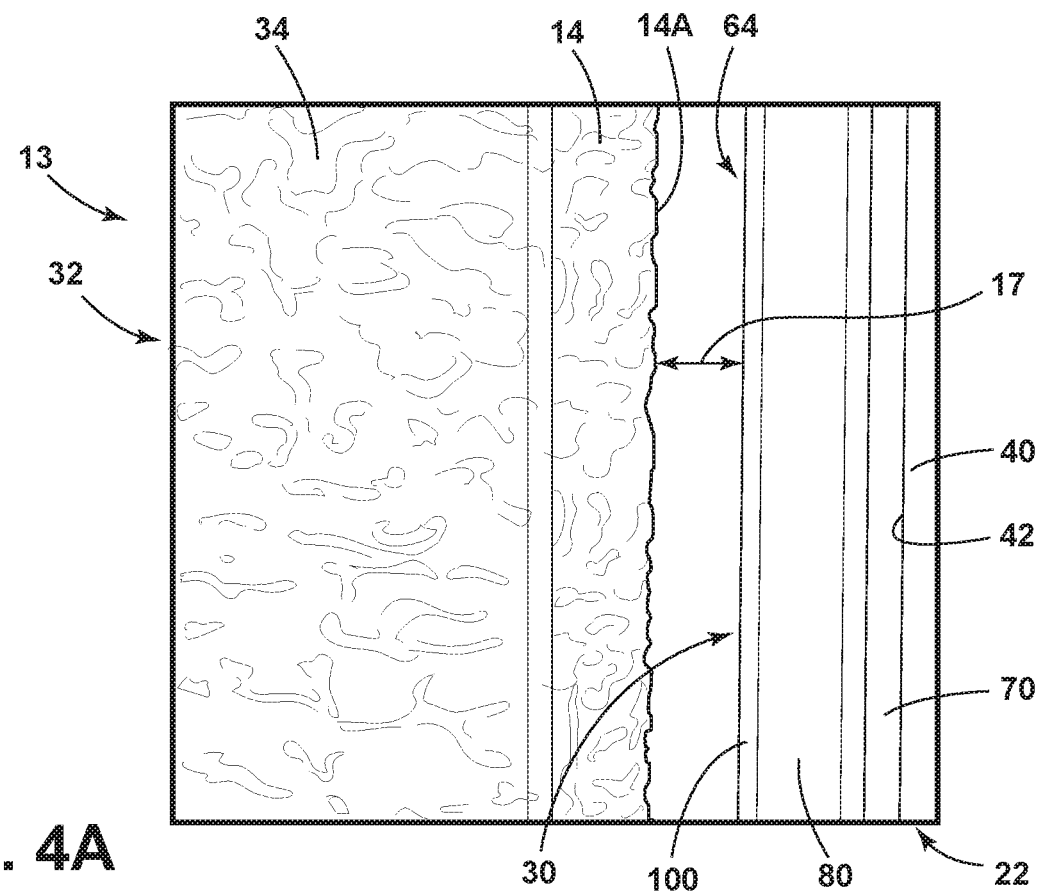
FIG. 4A is a side perspective view of the drawer assembly of FIG. 1B having the gasket assembly of FIG. 3, wherein the drawer assembly is nearing a closed position relative to the cabinet structure.

Referring now to FIG. 4A, a vertical portion 64 of the gasket assembly 30 of FIG. 3 is shown mounted to the inner surface 42 of the drawer front 40. As noted above, the gasket assembly 30 is configured for sealing engagement with the front surface 14 of the cabinet structure 13 when the drawer front 40 closes the access opening 56. As shown in FIG. 4A, the drawer assembly 22 is slightly open, and therefore the drawer front 40 is slightly spaced-apart from the front surface 14 of the cabinet structure 13. As noted above, the drawer assembly 22 is configured for sliding movement along the path indicated by arrow 17 between the open and closed positions.

Figure 4B:
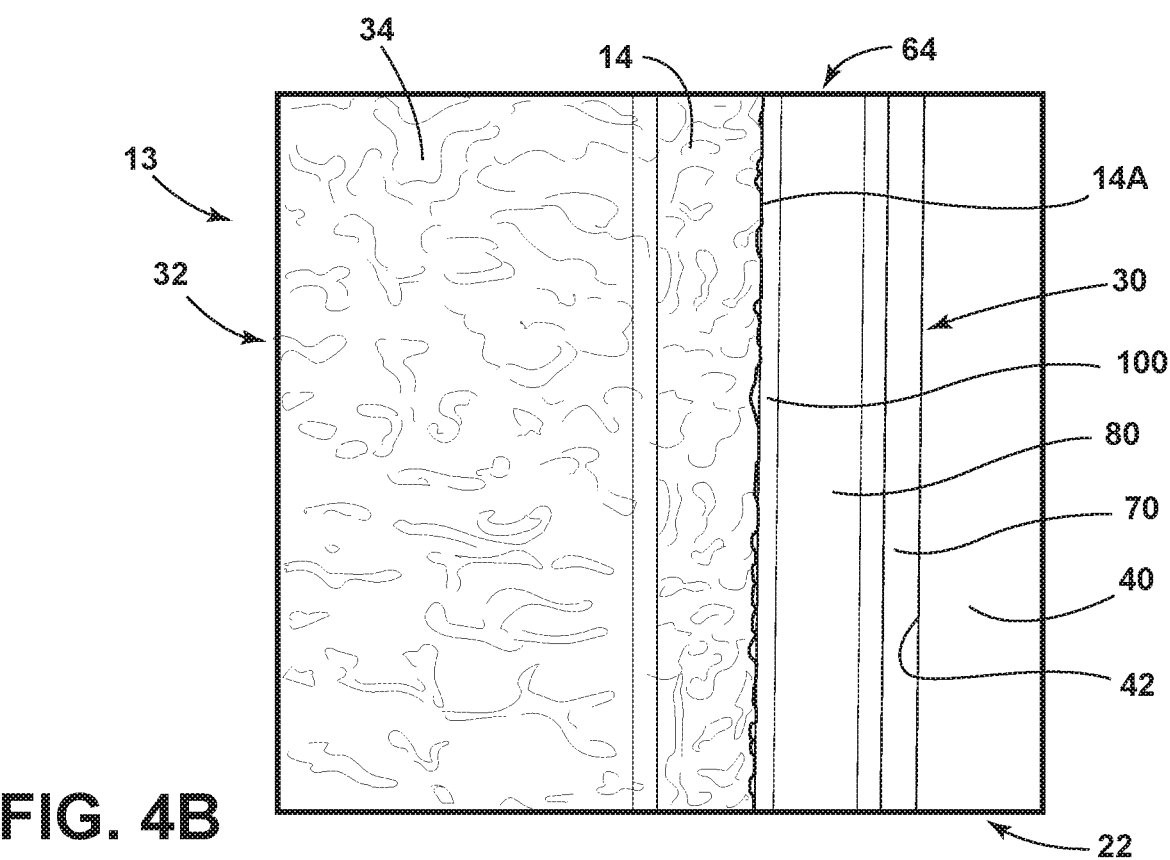
FIG. 4B is a side perspective view of the drawer assembly of FIG. 4A with the drawer assembly in the closed position relative to the cabinet structure.

Referring now to FIG. 4B, the contact lobe 80 of the vertical portion 64 of the gasket assembly 30 outwardly extends from the second side 74 of the base portion 70 and is shown in FIG. 4B with the first rib 100 in a sealing engagement with the front surface 14 of the cabinet structure 13. As the outer of the two ribs, the first rib 100 seals the gasket assembly 30 to the textured front surface 14 of the cabinet structure 13. Using the soft gel-like material of the first rib 100, and the non-resistant nature to indentation of the first rib 100, the first rib 100 deforms to fill the micro pathways created by the textured outer front surface 14 of the cabinet structure 13, such that no spacing exists between the gasket assembly 30 and the cabinet structure 13, unlike the case with the known seal assembly SA shown in FIG. 2. It is further contemplated that the second rib 102 of the gasket assembly 30 also seals against the textured outer front surface 14 of the cabinet structure 13 in a concentric manner relative to the first rib 100. In this way, more than one air-tight seal is created around the access opening 56 to the freezer compartment 24 using the gasket assembly 30 of the present concept.

Figure 5A:
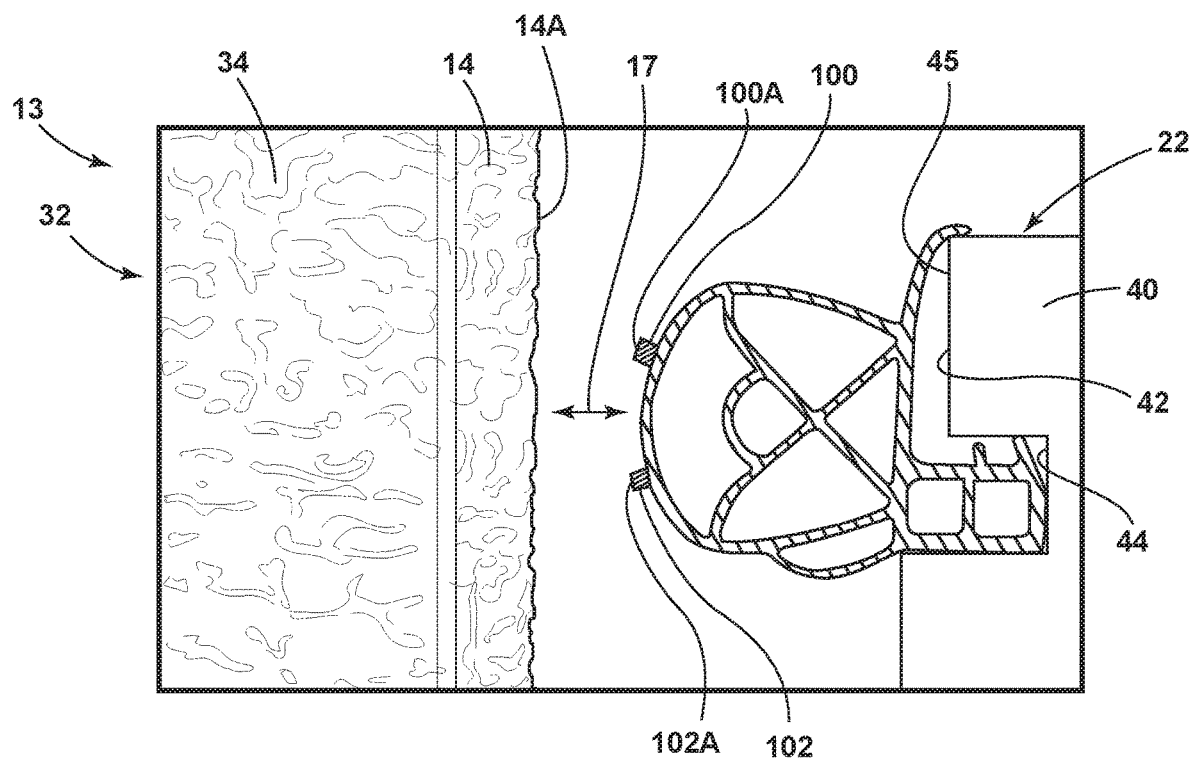
FIG. 5A is a side perspective view of the drawer assembly of FIG. 1B having the gasket assembly of FIG. 3, wherein the drawer assembly is nearing a closed position relative to the cabinet structure.

Referring now to FIG. 5A, a horizontal portion 62 of the gasket assembly 30 of FIG. 3 is shown mounted to the inner surface 42 of the drawer front 40 at a recessed channel 44 disposed around a periphery 45 of the inner surface 42 of the drawer front 40. The recessed channel 44 is contemplated to extend along an entirety of the periphery 45 of the drawer front 40 along the inner surface 42 thereof, such that the gasket assembly 30 is contemplated to be an elongate member having both the horizontal and vertical portions 62, 64 (FIG. 3) and the interconnecting corner portions 66 (FIG. 3) surround the entire inner surface 42 of the drawer front 40. As shown in FIG. 5A, the drawer assembly 22 is slightly open, and therefore the drawer front 40 is slightly spaced-apart from the front surface 14 of the cabinet structure 13. As noted above, the drawer assembly 22 is configured for sliding movement along the path indicated by arrow 17 between the open and closed positions. As shown in FIG. 5A, the mounting portion 76 of the gasket assembly 30 extends outwardly from the first side 72 of the base portion 70 of the gasket assembly 30 and is received in the recessed channel 44 of the drawer front 40 to releasably couple the gasket assembly 30 to the inner surface 42 of the drawer front 40. The barbs 77, 78 of the mounting portion 76 are shown engaged with the recessed channel 44 of the drawer front 40 to retain the gasket assembly 30 in-place.

Figure 5B:
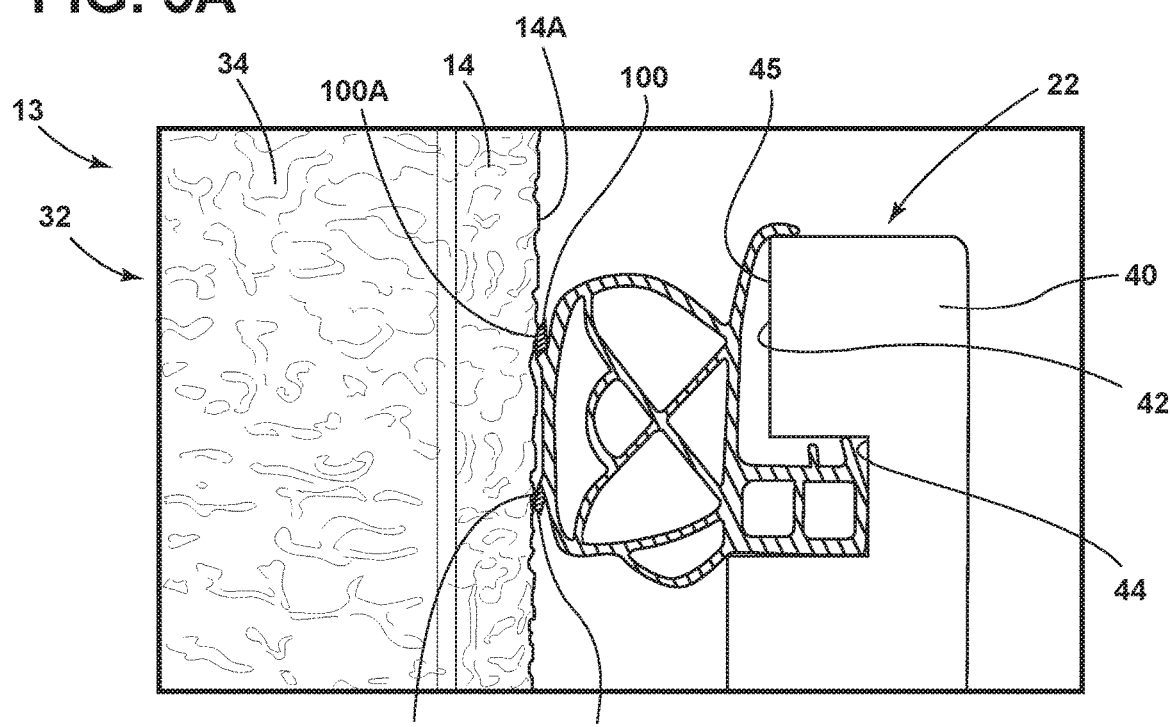
FIG. 5B is a side perspective view of the drawer assembly of FIG. 5A with the drawer assembly in the closed position relative to the cabinet structure.

Referring now to FIG. 5B, the contact lobe 80 of the horizontal portion 62 of the gasket assembly 30 outwardly extends from the second side 74 of the base portion 70 and is shown in FIG. 5B with both the first and second ribs 100, 102 in a sealing engagement with the front surface 14 of the cabinet structure 13. As shown in FIG. 5B, outermost portions 100A, 102A of the first and second ribs 100, 102 deform as engaged with the front surface 14 of the cabinet structure 13 to define a contact area of the gasket assembly 30 relative to the front surface 14 of the cabinet structure 13 when the drawer assembly 22 is in the closed position. The contact area defined by the outermost portions 100A, 102A of the first and second ribs 100, 102 combined is contemplated to be less than 2 mm when viewed in a cross-sectional plane substantially perpendicular to the outer surface 96 of the contact lobe 80, such as the plane of cross-section shown in FIG. 5B. It is further contemplated that the contact area defined by the outermost portions 100A, 102A of the first and second ribs 100, 102 combined is less than 1 mm when viewed in a cross-sectional plane substantially perpendicular to the outer surface 96 of the contact lobe 80, such as the cross-sectional plane shown in FIG. 5B. This contact surface extends around the outer periphery 45 of the inner surface 42 of the drawer front 40 as disposed along an entirety of the gasket assembly 30, such that the total contact area between the gasket assembly 30 and the front surface 14 of the cabinet structure 13 is less than 1 mm times the overall length of the gasket assembly 30.

Figure 6A:
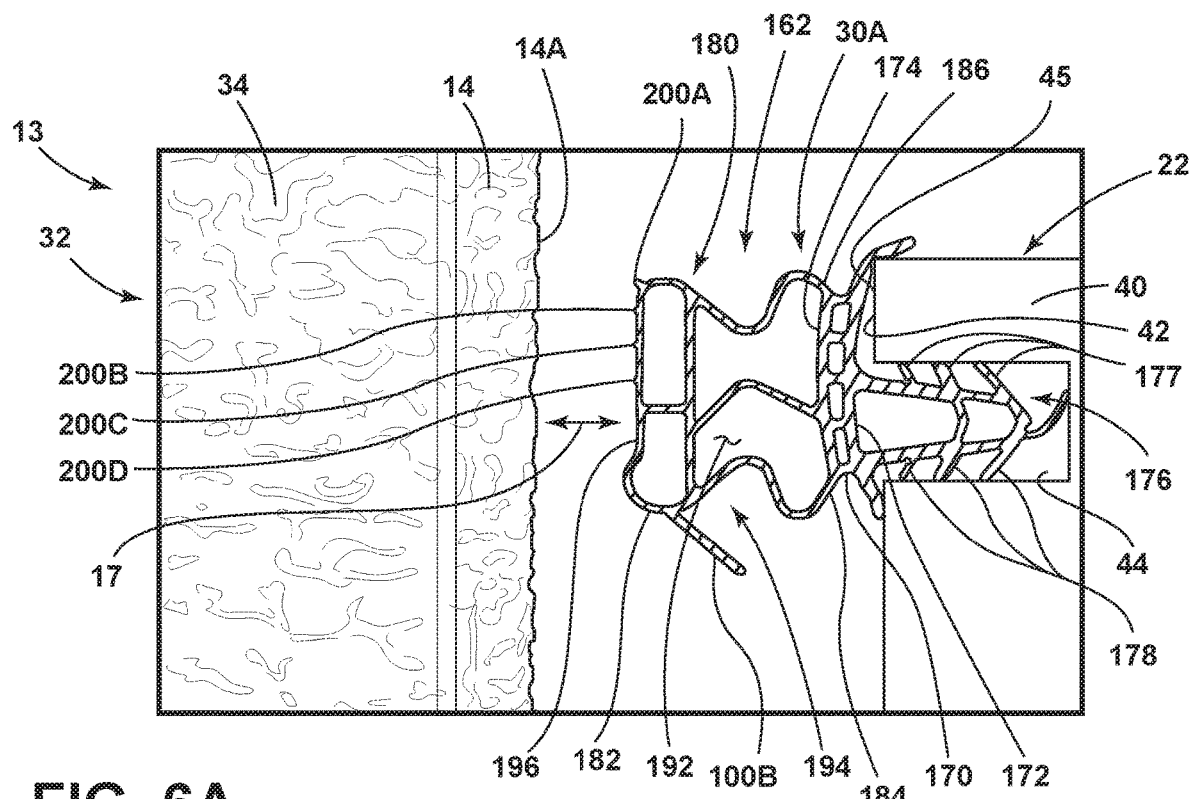
FIG. 6A is a side perspective view of the drawer assembly of FIG. 1B having a gasket assembly according to another embodiment, wherein the drawer assembly is nearing a closed position relative to the cabinet structure.

Referring now to FIG. 6A, a horizontal portion 162 of another embodiment of a gasket assembly 30A is shown mounted to the inner surface 42 of the drawer front 40 at a recessed channel 44 disposed around a periphery 45 of the inner surface 42 of the drawer front 40. As shown in FIG. 6A, the drawer assembly 22 is slightly open, and therefore the drawer front 40 is slightly spaced-apart from the front surface 14 of the cabinet structure 13. As noted above, the drawer assembly 22 is configured for sliding movement along the path indicated by arrow 17 between the open and closed positions. As shown in FIG. 6A, the gasket assembly 30A includes a mounting portion 176 that extends outwardly from the first side 172 of a base portion 170 of the gasket assembly 30A. The mounting portion 176 is shown in FIG. 6A as being received in the recessed channel 44 of the drawer front 40 to releasably couple the gasket assembly 30A to the inner surface 42 of the drawer front 40. Barbs 177, 178 of the mounting portion 176 of gasket assembly 30A are shown engaged with the recessed channel 44 of the drawer front 40 to retain the gasket assembly 30A in-place. The gasket assembly 30A of FIG. 6A includes a contact lobe 180 that outwardly extends from the second side 174 of the base portion 170. The contact lobe 180 includes a body portion 182 having first and second ends 184, 186 operably coupled to the second side 174 of the base portion 170 at spaced-apart attachment locations and forming therewith an interior cavity 192 containing a plurality of compressible chambers 194.

Much like the body portion 82 of the contact lobe 80 of the gasket assembly 30 described above, the body portion 182 of the contact lobe 180 of the gasket assembly 30A is comprised of a more rigid material having an outer surface 196. A plurality of longitudinally extending spaced-apart ribs 200A-200D, comprised of a less rigid material relative to the more rigid material of the body portion 182, extends outwardly from the outer surface 196 of the body portion 182 of the contact lobe 180. The less rigid material of the spaced-apart ribs 200A-200D is contemplated to be a soft material akin to the less rigid material described above with reference to the ribs 100, 102 shown in FIG. 3. As outwardly extending from the outer surface 196 of the body portion 182 of the contact lobe 180, the ribs 200A-200D provide a reduced contact area for the gasket assembly 30A as compared to a gasket assembly without ribs that would generally seal against the cabinet structure 13.

Figure 6B:
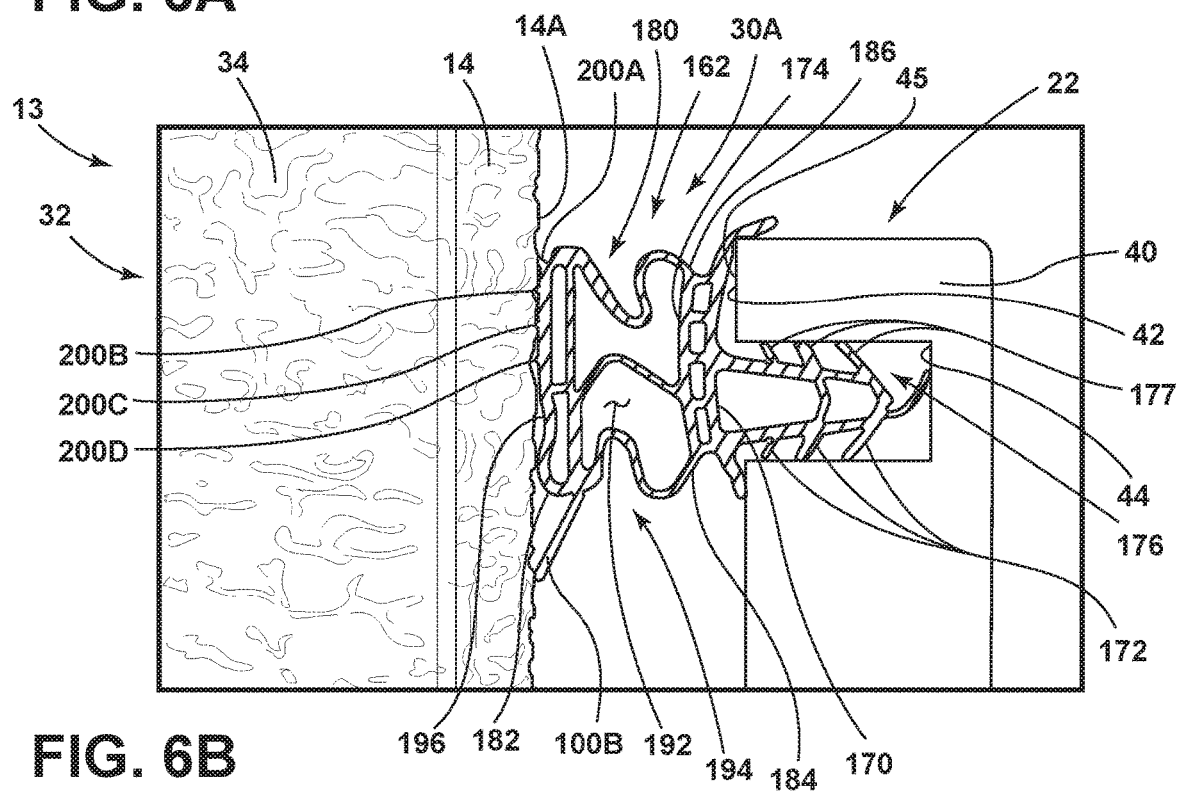
FIG. 6B is a side perspective view of the drawer assembly of FIG. 6A with the drawer assembly in the closed position relative to the cabinet structure.

Referring now to FIG. 6B, the contact lobe 180 that outwardly extends from the second side 174 of the base portion 170 of the gasket assembly 30A is shown in FIG. 6B with the ribs 200A-200D in a sealing engagement with the front surface 14 of the cabinet structure 13. Outermost portions of the ribs 200A-200D, much like outermost portions 100A, 102A of the first and second ribs 100, 102 described above, deform as engaged with the front surface 14 of the cabinet structure 13 to define a contact area of the gasket assembly 30A relative to the front surface 14 of the cabinet structure 13 when the drawer assembly 22 is in the closed position. The contact area defined by the outermost portions of the ribs 200A-200D combined is contemplated to be less than 2 mm when viewed in a cross-sectional plane substantially perpendicular to the outer surface 196 of the contact lobe 180, such as the plane of cross-section shown in FIG. 6B. It is further contemplated that the contact area defined by the outermost portions of the ribs 200A-200D combined is less than 1 mm when viewed in a cross-sectional plane substantially perpendicular to the outer surface 196 of the contact lobe 180, such as the cross-sectional plane shown in FIG. 6B. This contact surface extends around the outer periphery 45 of the inner surface 42 of the drawer front 40 as disposed along an entirety of the gasket assembly 30A, such that the total contact area between the gasket assembly 30A and the front surface 14 of the cabinet structure 13 is less than 1 mm times the overall length of the gasket assembly 30A.

As noted above, the drawer assembly 22 is operably coupled to the freezer compartment 24 by the slide assemblies 52, 54 along the closing travel path 17 defined between an extended or open position of the drawer assembly 22 and a closed position of the drawer assembly 22. As further noted above, the slide assemblies 52, 54 provide a closure force for the drawer assembly 22 of at least 2 pounds of axial force directed in a closing direction when the drawer assembly 22 is in the closed position. Given the very soft material of which the ribs 100, 102 and 200A-200D are comprised, as described above, a closure force of about 2 pounds to about 3 pounds applied to the drawer front 40 is sufficient to fully seal the ribs 100, 102 and 200A-200D to the textured front surface 14 of the cabinet structure 13, as shown in FIGS. 4B, 5B and 6B. Other gasket assemblies may require a magnet to provide a suitable sealing arrangement, however, magnetic attraction forces are not required with the gasket assemblies 30, 30A or the present concept given the soft sealing material of the ribs 100, 102 and 200A-200D.

It is contemplated that the first material provided in the body portion 82, 182 of the contact lobe 80, 180 is a thermoplastic elastomer material that is flexibly resilient. It is further contemplated that the second material of the ribs 100, 102 and 200A-200D is a thermoplastic miscible material. In this way, a so-called "weld" may be made between the first and second materials during a co-extrusion of the gasket assemblies 30, 30A. For a proper weld between the first and second materials of the contact lobe 80, 180 and the ribs 100, 102, 200A-200D the thermoplastic elastomer material of the ribs 100, 102, 200A-200D must be miscible with that of the thermoplastic elastomer material of the respective contact lobes 80, 180. Thus, the first and second materials may be substantially the same polymer, or different, so long as the second material is miscible with the first material (hence "weld-miscible"). More particularly, by "weld-miscible" polymers we refer to those which are miscible so that there is no visually evident phase separation of the polymer phases in the manufactured gasket assembly 30, 30A.

According to one aspect of the present disclosure, a refrigerator includes a cabinet structure with a front surface and a storage compartment with an access opening surrounded by the front surface. A drawer assembly includes a drawer front for selectively closing the access opening. The drawer front includes a recessed channel disposed around a periphery of an inner surface of the drawer front. A gasket assembly is mounted to the drawer front at the recessed channel for sealing engagement with the front surface of the cabinet structure when the drawer front closes the access opening. The gasket assembly includes an elongated body of co-extruded material including a base portion with a mounting portion extending outwardly from a first side of the base portion and received in the recessed channel of the drawer front. A contact lobe outwardly extends from a second side of the base portion for sealing engagement with the front surface of the cabinet structure. The contact lobe includes a body portion having first and second ends that are operably coupled to the second side of the base portion at spaced-apart attachment locations and form, therewith, an interior cavity containing a plurality of compressible chambers. The body portion of the contact lobe is comprised of a first material having an outer surface with a pair of longitudinally extending spaced-apart ribs comprised of a second material that is less rigid than the first material. The spaced-apart ribs extend outwardly from the outer surface of the body portion of the contact lobe.

According to another aspect of the present disclosure, the pair of longitudinally extending spaced-apart ribs defines a contact area of the gasket assembly relative to the front surface of the cabinet structure when the drawer assembly is in a closed position.

According to another aspect of the present disclosure, the contact area is less than 2 mm when viewed in a cross-sectional plane substantially perpendicular to the outer surface of the contact lobe.

According to another aspect of the present disclosure, the contact area is less than 1 mm.

According to another aspect of the present disclosure, the first material includes a thermoplastic elastomer material.

According to another aspect of the present disclosure, the second material includes a thermoplastic miscible material.

According to another aspect of the present disclosure, the second material includes a hardness of less than 1 unit on the Shore 00 hardness scale.

According to another aspect of the present disclosure, a gasket assembly includes a base portion having opposed first and second sides. A mounting portion extends outwardly from the first side of the base portion. A contact lobe outwardly extends from the second side of the base portion and includes a body portion with an interior cavity. The body portion of the contact lobe is comprised of a first material having an outer surface with a plurality of spaced-apart ribs comprised of a second material extending outwardly from the outer surface of the body portion of the contact lobe.

According to another aspect of the present disclosure, the first material is more rigid than the second material.

According to another aspect of the present disclosure, the second material includes a hardness of less than 1 unit on the Shore 00 hardness scale.

According to another aspect of the present disclosure, the first material includes a thermoplastic elastomer material.

According to another aspect of the present disclosure, the second material includes a thermoplastic miscible material.

According to another aspect of the present disclosure, a plurality of compressible chambers are disposed within the interior cavity of the contact lobe.

According to another aspect of the present disclosure, the plurality of spaced-apart ribs defines a contact area of the gasket assembly, wherein the contact area is less than 2 mm when viewed in a cross-sectional plane substantially perpendicular to the outer surface of the contact lobe.

According to another aspect of the present disclosure, the contact area is less than 1 mm.

According to yet another aspect of the present disclosure, a refrigerator includes a cabinet structure having a textured front surface and a freezer compartment with an access opening that opens into the freezer compartment. A drawer assembly includes a drawer front for selectively closing the access opening. A gasket assembly is mounted to an inner surface of the drawer front. The gasket assembly includes a contact lobe having a body portion comprised of a more rigid material. The body portion further includes an outer surface with at least one rib outwardly extending therefrom. The at least one rib is comprised of a less rigid material relative to the more rigid material of the body portion of the contact lobe and includes a hardness of less than 1 unit on the Shore 00 hardness scale.

According to another aspect of the present disclosure, the drawer assembly is operably coupled to the freezer compartment by one or more slide assemblies along a closing travel path defined between an extended position of the drawer assembly and a closed position of the drawer assembly.

According to another aspect of the present disclosure, the one or more slide assemblies provide a closure force for the drawer assembly of at least 2 pounds when the drawer assembly is in the closed position.

According to another aspect of the present disclosure, a closure force of about 2 pounds to about 3 pounds applied to the drawer front is sufficient to seal the at least one rib to the textured front surface of the cabinet structure.

According to another aspect of the present disclosure, the at least one rib includes first and second ribs spaced-apart from one another.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A refrigerator comprising:
a cabinet structure having a front surface and a storage compartment having an access opening surrounded by the front surface;
a drawer assembly having a drawer front for selectively closing the access opening, wherein the drawer front includes a recessed channel disposed around a periphery of an inner surface of the drawer front; and
a gasket assembly mounted to the drawer front at the recessed channel for sealing engagement with the front surface of the cabinet structure when the drawer front closes the access opening, wherein the gasket assembly includes an elongated body of co-extruded material including a base portion having a mounting portion extending outwardly from a first side of the base portion and received in the recessed channel of the drawer front, a contact lobe outwardly extending from a second side of the base portion for sealing engagement with the front surface of the cabinet structure, wherein the contact lobe includes a body portion having first and second ends operably coupled to the second side of the base portion at spaced-apart attachment locations and forming therewith an interior cavity containing a plurality of compressible chambers, and further wherein the body portion of the contact lobe is comprised of a first material having an outer surface with a pair of longitudinally extending spaced-apart ribs comprised of a second material that is less rigid than the first material extending outwardly from the outer surface of the body portion of the contact lobe.

2. The refrigerator of claim 1, wherein the pair of longitudinally extending spaced-apart ribs defines a contact area of the gasket assembly relative to the front surface of the cabinet structure when the drawer assembly is in a closed position.

3. The refrigerator of claim 2, wherein the contact area is less than 2 mm when viewed in a cross-sectional plane substantially perpendicular to the outer surface of the contact lobe.

4. The refrigerator of claim 3, wherein the contact area is less than 1 mm.

5. The refrigerator of claim 1, wherein the first material includes a thermoplastic elastomer material.

6. The refrigerator of claim 5, wherein the second material include a thermoplastic miscible material.

7. The refrigerator of claim 1, wherein the second material includes a hardness of less than 1 unit on the Shore 00 hardness scale.

8. A gasket assembly, comprising:
a base portion having opposed first and second sides;
a mounting portion extending outwardly from the first side of the base portion; and
a contact lobe outwardly extending from the second side of the base portion and having a body portion with an interior cavity, and further wherein the body portion of the contact lobe is comprised of a first material having an outer surface with a pair of longitudinally extending spaced-apart ribs comprised of a second material that is less rigid than the first material extending outwardly from the outer surface of the body portion of the contact lobe, and further wherein the second material includes a hardness of less than 1 unit on the Shore 00 hardness scale.

9. The gasket assembly of claim 8, wherein the first material includes a thermoplastic elastomer material.

10. The gasket assembly of claim 9, wherein the second material include a thermoplastic miscible material.

11. The gasket assembly of claim 8, a plurality of compressible chambers disposed within the interior cavity of the contact lobe.

12. The gasket assembly of claim 8, wherein the pair of longitudinally extending spaced-apart ribs defines a contact area of the gasket assembly, and further wherein the contact area is less than 2 mm when viewed in a cross-sectional plane substantially perpendicular to the outer surface of the contact lobe.

13. The gasket assembly of claim 12, wherein the contact area is less than 1 mm.

14. A refrigerator comprising:
a cabinet structure having a textured front surface and a freezer compartment having an access opening that opens into the freezer compartment;
a drawer assembly having a drawer front for selectively closing the access opening; and
a gasket assembly mounted to an inner surface of the drawer front, wherein the gasket assembly includes a contact lobe having a body portion comprised of a more rigid material, wherein the body portion further includes an outer surface with at least one rib outwardly extending therefrom, wherein the at least one rib is comprised of a less rigid material relative to the more rigid material of the body portion of the contact lobe an having a hardness of less than 1 unit on the Shore 00 hardness scale.

15. The refrigerator of claim 14, wherein the drawer assembly is operably coupled to the freezer compartment by one or more slide assemblies along a closing travel path defined between an extended position of the drawer assembly and a closed position of the drawer assembly.

16. The refrigerator of claim 15, wherein the one or more slide assemblies provide a closure force for the drawer assembly of at least 2 pounds when the drawer assembly is in the closed position.

17. The refrigerator of claim 16, wherein a closure force of about 2 pounds to about 3 pounds applied to the drawer front is sufficient to seal the at least one rib to the textured front surface of the cabinet structure.

18. The refrigerator of claim 17, wherein the at least one rib includes first and second ribs spaced-apart from one another.

* * * * *